US009949215B2

United States Patent
Li et al.

(10) Patent No.: US 9,949,215 B2
(45) Date of Patent: Apr. 17, 2018

(54) METHOD AND APPARATUS FOR RESOURCE SHARING FOR DEVICE-TO-DEVICE AND CELLULAR COMMUNICATIONS IN A MULTICELL NETWORK

(71) Applicant: NEC (CHINA) CO., LTD., Beijing (CN)

(72) Inventors: Chaofeng Li, Beijing (CN); Ming Lei, Beijing (CN); Jiaheng Wang, Nanjing (CN); Daohua Zhu, Nanjing (CN); Hua Zhang, Nanjing (CN); Chunming Zhao, Nanjing (CN)

(73) Assignee: NEC (China) Co., Ltd., Beijing (CN)

( * ) Notice: Subject to any disclaimer, the term of this patent is extended or adjusted under 35 U.S.C. 154(b) by 58 days.

(21) Appl. No.: 14/785,775

(22) PCT Filed: May 3, 2013

(86) PCT No.: PCT/CN2013/075127
§ 371 (c)(1),
(2) Date: Oct. 20, 2015

(87) PCT Pub. No.: WO2014/176782
PCT Pub. Date: Nov. 6, 2014

(65) Prior Publication Data
US 2016/0081046 A1   Mar. 17, 2016

(51) Int. Cl.
*H04L 5/14* (2006.01)
*H04W 52/38* (2009.01)
(Continued)

(52) U.S. Cl.
CPC ....... *H04W 52/383* (2013.01); *H04W 52/241* (2013.01); *H04W 52/343* (2013.01);
(Continued)

(58) Field of Classification Search
None
See application file for complete search history.

(56) References Cited

U.S. PATENT DOCUMENTS

| | | | | |
|---|---|---|---|---|
| 2003/0048856 | A1* | 3/2003 | Ketchum | H04L 1/0009 375/260 |
| 2009/0325625 | A1* | 12/2009 | Hugl | H04W 52/16 455/522 |

(Continued)

FOREIGN PATENT DOCUMENTS

| | | |
|---|---|---|
| CN | 102917465 A | 2/2013 |
| WO | 2011/011637 A2 | 1/2011 |
| WO | 2011/143496 A1 | 11/2011 |

OTHER PUBLICATIONS

International Search Report of PCT/CN2013/075127 dated Feb. 13, 2014 [PCT/ISA/210].

(Continued)

*Primary Examiner* — Edan Orgad
*Assistant Examiner* — Sithu Ko
(74) *Attorney, Agent, or Firm* — Sughrue Mion, PLLC

(57) ABSTRACT

Embodiments of the disclosure provide a method and apparatus for resource sharing for D2D and cellular communications in a multicell network. The method comprises steps of: acquiring CSI on channels relating to D2D pair and a plurality of cellular users that potentially share resources with the D2D pair; and determining D2D transmit powers of the D2D pair on a plurality of frequency bands allocated to the plurality of cellular users and cellular transmit powers of the plurality of cellular users based on the CSI, to improve throughput of the multicell network.

16 Claims, 8 Drawing Sheets

(51) Int. Cl.
*H04W 72/08* (2009.01)
*H04W 52/24* (2009.01)
*H04W 52/36* (2009.01)
*H04W 52/34* (2009.01)
*H04W 52/14* (2009.01)

(52) U.S. Cl.
CPC ....... *H04W 52/367* (2013.01); *H04W 72/082* (2013.01); *H04W 52/146* (2013.01)

(56) References Cited

U.S. PATENT DOCUMENTS

| | | | | |
|---|---|---|---|---|
| 2012/0281556 A1* | 11/2012 | Sayana | ............... | H04B 7/024 370/252 |
| 2014/0226481 A1* | 8/2014 | Dahod | ............ | H04W 36/0055 370/235 |
| 2014/0274088 A1* | 9/2014 | Talwar | ............... | H04J 11/0023 455/452.1 |

OTHER PUBLICATIONS

Written Opinion of PCT/CN2013/075127 dated Feb. 13, 2014 [PCT/ISA/237].

* cited by examiner

METHOD AND APPARATUS FOR RESOURCE SHARING FOR DEVICE-TO-DEVICE AND CELLULAR COMMUNICATIONS IN A MULTICELL NETWORK

CROSS REFERENCE TO RELATED APPLICATIONS

This application is a National Stage of International Application No. PCT/CN2013/075127 filed May 3, 2013, the contents of which are incorporated herein by reference in its entirety.

FIELD OF THE INVENTION

Embodiments of the present invention generally relate to communication techniques. More particularly, embodiments of the present invention relate to methods and apparatuses for resource sharing for device-to-device (D2D) and cellular communications in a multicell network.

BACKGROUND OF THE INVENTION

Nowadays, the demand of high-speed data services on wireless bandwidth grows constantly, which has promoted various new technologies to be developed. For example, Device-to-Device (D2D) communication has been proposed to be an underlay to a cellular network so as to improve spectrum efficiency and system sum rate. The D2D communication is a new type of technology that allows user equipments (UEs) to communicate with each other through a direct connection instead of being relayed by a base station, and it is expected to become a key feature to be supported by next generation cellular networks. In the D2D communication, the D2D UEs could share the same subcarrier resources with conventional cellular UEs while the setup process will be still controlled by the network. As such, the D2D communication can provide a higher date rate, reduce power consumption, and lead to efficient resource (such as spectrum) utilization.

As an underlay to cellular systems, the D2D communication may share resources with cellular users in an either orthogonal or in a non-orthogonal manner. In an orthogonal sharing scheme, dedicated resources are allocated to D2D users. This scheme is easy to implement, but it can not fully exploit the potential of D2D communication to improve spectral efficiency of cellular systems. For this reason, the non-orthogonal sharing scheme has been also received much attention. In the non-orthogonal sharing scheme, the same resources are shared by the cellular users and the D2D users. However, due to resource sharing, the D2D communication may cause undesirable interference to the cellular users. Particularly, during the downlink (DL) transmission, the cellular users may suffer from interference from a D2D transmitter, and on the other hand, during the uplink (UL) transmission, a base station (BS) may be a victim of interference from the D2D transmitter. Therefore, in order to ensure that D2D communication is utilized efficiently, it usually requires employing appropriate resource sharing schemes with effective interference management.

Amongst others, optimizing resource sharing of the D2D communication underlaying cellular systems is of particular interest. For example, in paper "Resource sharing optimization for device-to-device communication underlaying cellular networks," (C.-H. Yu, K. Doppler, C. B. Ribeiro, and O. Tirkkonen, IEEE Trans. Wireless Commun., vol. 10, no. 8, pp. 2752-2763, August 2011), there is disclosed a resource sharing optimization scheme. According to the scheme proposed in this paper, there are three resource allocation modes, i.e., a non-orthogonal sharing mode, an orthogonal sharing mode and a cellular mode. In the non-orthogonal sharing mode, D2D users and cellular users reuse the same resources, which may cause interferences to each other; in the orthogonal sharing mode, the D2D users are allocated part of the resources and the remaining part of resources is left to the cellular user for signal transmission; and in the cellular mode, the D2D users conventionally communicate with each other through the BS that acts as a relay node.

However, the schemes proposed by this paper are silent with the scenario of a multicell network or a coordinated system, e.g., conventional flattening multicell network, C-RAN, etc., where the D2D communication may share the spectra of multiple uplink cellular uses (CUs) in adjacent cells or Remote Radio Units (RRUs). Therefore, there is a need to find resource sharing schemes for D2D and cellular communications in the multicell network.

SUMMARY OF THE INVENTION

In view of the foregoing, the present disclosure provides a new solution for resource sharing between D2D and cellular communications in a multicell network, so as to solve or at least partially mitigate at least a part of problems in the prior art.

According to a first aspect of the present invention, embodiments of the invention provide a method for resource sharing for D2D and cellular communications in a multicell network. The method may comprise: acquiring channel state information (CSI) on channels relating to D2D pair and a plurality of cellular users that potentially share resources with the D2D pair; and determining D2D transmit powers of the D2D pair on a plurality of frequency bands allocated to the plurality of cellular users and cellular transmit powers of the plurality of cellular users based on the CSI, to improve throughput of the multicell network.

According to a second aspect of the present invention, embodiments of the invention provide an apparatus for resource sharing for D2D and cellular communications in a multicell network. The apparatus may comprise: an acquirer configured to acquire channel state information (CSI) on channels relating to D2D pair and a plurality of cellular users that potentially share resources with the D2D pair; and a determiner configured to determine D2D transmit powers of the D2D pair on a plurality of frequency bands allocated to the plurality of cellular users and cellular transmit powers of the plurality of cellular users based on the CSI, to improve throughput of the multicell network.

Compared with those existing solutions, it is advantage that the proposed solution effectively optimizes the throughput of the multicell network by maximizing the weighted sum rate of the cellular and D2D users.

Other features and advantages of the embodiments of the present invention will also be apparent from the following description of specific embodiments when read in conjunction with the accompanying drawings, which illustrate, by way of example, the principles of embodiments of the invention.

BRIEF DESCRIPTION OF THE DRAWINGS

Embodiments of the invention are presented in the sense of examples and their advantages are explained in greater detail below, with reference to the accompanying drawings, where.

DETAILED DESCRIPTION OF EMBODIMENTS

Embodiments of the invention will be described thoroughly hereinafter with reference to the accompanying drawings. It will be apparent to those skilled in the art that the invention may, however, be embodied in many different forms and should not be construed as limited to the embodiments and specific details set forth herein. Like numbers refer to like elements throughout the specification.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments. Beside, the indefinite article "a/an" as used herein does not exclude a plurality of such steps, units, modules, devices, and objects, and etc.

In the disclosure, a multicell network refers to a network comprising multiple cells. The multicell network may be, for example, conventional multicell network, C-RAN (C-Radio Access Network), or some other suitable network comprising multiple cells. In the disclosure, a C-RAN may integrate Centralized processing, Cooperative radio, Cloud computing, and so on.

Embodiments of the present invention may be applied in various multicell networks including but not limited to the C-RAN or the conventional multicell network. Given the rapid development in communications, there will of course also be future type wireless communication technologies and multicell networks with which the present invention may be embodied. It should not be seen as limiting the scope of the invention to only the aforementioned system.

In the disclosure, a base station (BS) may represent, e.g., a node B (NodeB or NB), an evolved NodeB (eNodeB or eNB), a Remote Radio Unit (RRU), a radio header (RH), a remote radio head (RRH), a relay, a low power node such as a femto, a pico, and so on.

In the disclosure, a user may refer to a user equipment (UE), a terminal, a Mobile Terminal (MT), a Subscriber Station (SS), a Portable Subscriber Station (PSS), Mobile Station (MS), or an Access Terminal (AT), and some or all of the functions of the UE, the terminal, the MT, the SS, the PSS, the MS, or the AT may be included. In the disclosure, a cellular user may refer to a user, e.g., a UE or a terminal, which performs conventional cellular communication with its BS.

Figure 1:
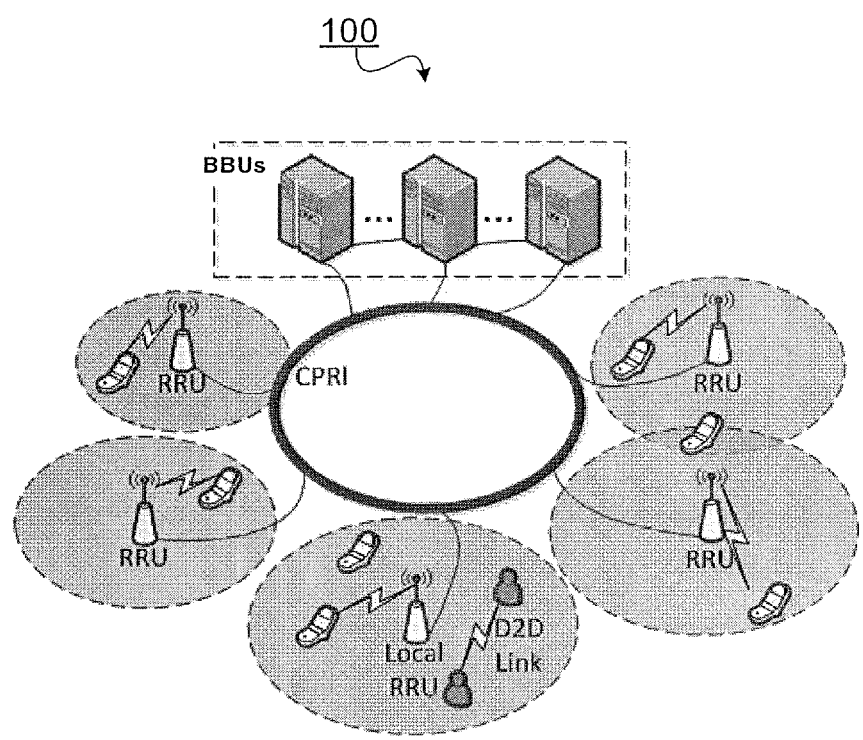
FIG. 1 illustrates a schematic diagram 100 of a C-RAN according to embodiments of the invention.

Reference is first made to FIG. 1, which illustrates a schematic diagram 100 of a C-RAN according to embodiments of the invention. The C-RAN is a larger radio access system formed through a cloud computing technology. The C-RAN connects the BBUs of multiple base stations through fibers or an optical transport network, and uses the cloud computing technology to virtualize the processing resources of all BBUs into a uniform resource pool. In this way, the system can implement statistical multiplexing of signal processing resources, which reduces the system cost significantly.

The C-RAN centralizes Baseband Units (BBUs) of distributed base stations in an area to form a BBU pool. Baseband signals of the RRUs in this area are processed in the same BBU pool. In this way, the mobility of users in this area does not affect the utilization of computing resources. The centralized BBUs may be connected to the RRUs in a larger area through fibers. If bandwidth and time delays of interlinks between BBUs permit, the BBUs in the area may also be interconnected to form a BBU pool. Since the BBU pool processes signals of multiple cells in a centralized manner, the method according to embodiments of the present invention may be implemented easily and flexibly in C-RAN.

FIG. 1 illustrates D2D communication underlaying C-RAN. Specifically, as shown in FIG. 1, the C-RAN 100 exemplarily comprises five RRUs and a plurality of BBUs (i.e., a BBU pool). The RRUs perform cellular communication with their respective cellular users. The D2D communication (i.e., the D2D link) is performed in the cell of one of the five RRUs, which is called as a "local RRU".

Figure 2A:
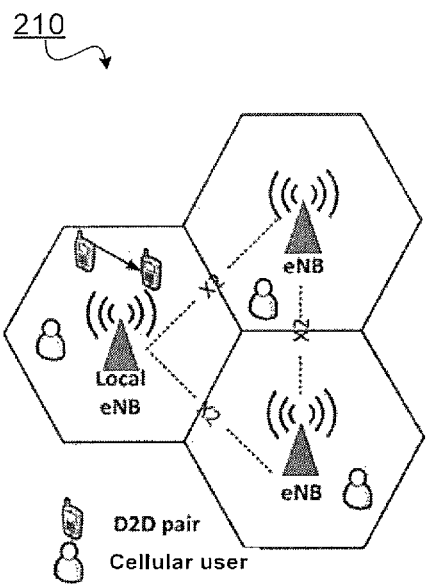
FIG. 2A illustrates a schematic diagram 210 of a conventional multicell network comprising three cells according to embodiments of the invention.
Figure 2B:
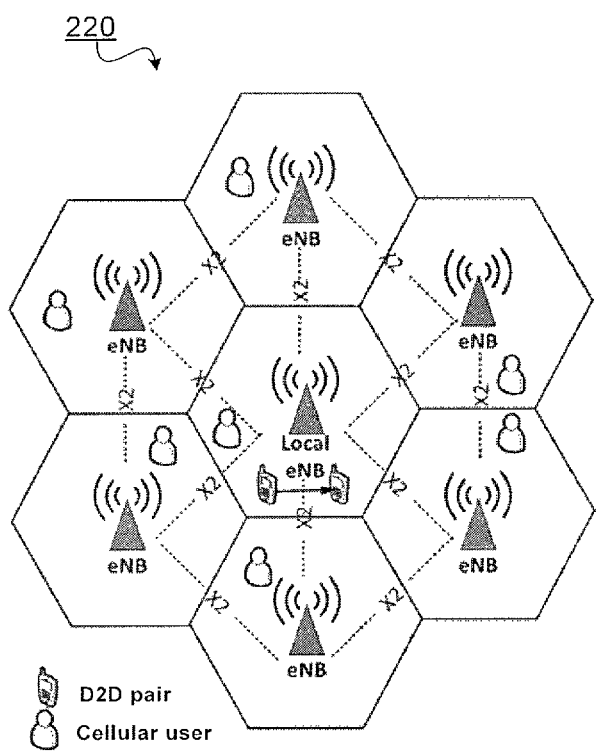
FIG. 2B illustrates a schematic diagram 220 of a conventional multicell network comprising seven cells according to embodiments of the invention.

FIG. 2A illustrates a schematic diagram 210 of a conventional multicell network comprising three cells according to embodiments of the invention, and FIG. 2B illustrates a schematic diagram 220 of a conventional multicell network comprising seven cells according to embodiments of the invention. Specifically, both FIGS. 2A and 2B show D2D communication in flattening coordinated multicell network, i.e., a conventional multicell network. As shown in FIGS. 2A and 2B, the multicell network 210 exemplarily comprises three or seven cells, in which three or seven eNBs perform cellular communication with their respective cellular users. The D2D communication is performed in one the cells, and the eNB managing the one of the cell may be called as a "local eNB".

According to embodiments of the present application, the BS (e.g., a eNB or a RRU) which manages a cell in which the D2D communication is performed may be called as a "local BS". In other words, the "local RRU" and the "local eNB" are both examples of the "local BS". A cell managed by the local BS, such as the local RRU or the local eNB, may be called as a "local cell".

As can be appreciated by those skilled in the art, the present disclosure can be applicable to any other suitable multicell network, but not limited to the specific arrangements shown in FIG. 1 and FIGS. 2A and 2B. The above arrangements are just shown for illustration, rather than limitation.

Figure 3:
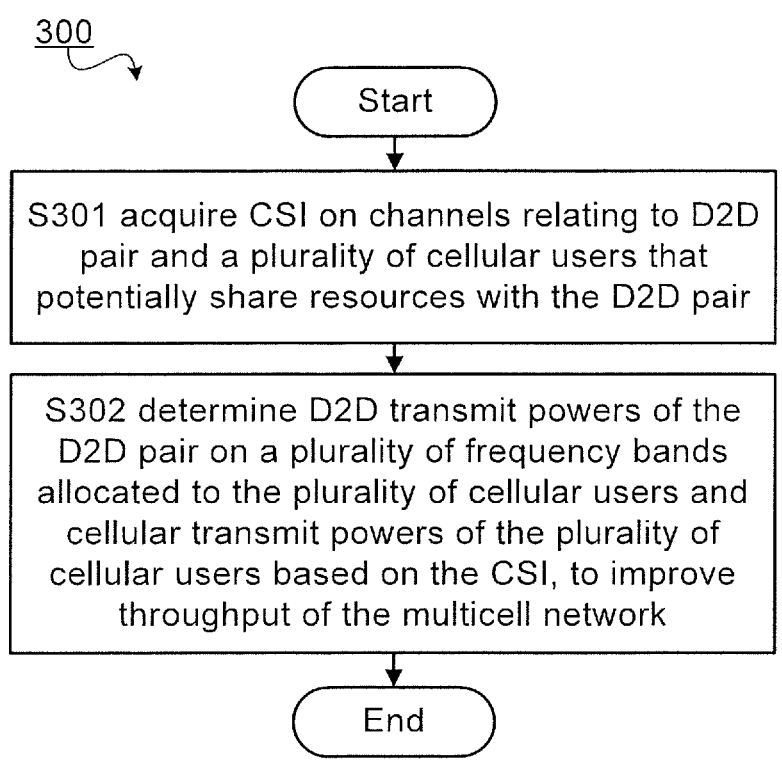
FIG. 3 illustrates a flow chart of a method 300 for resource sharing for D2D and cellular communications in a multicell network according to embodiments of the invention.

Reference is now made to FIG. 3, which illustrates a flow chart of a method 300 for resource sharing for D2D and cellular communications in a multicell network according to embodiments of the invention. In accordance with embodiments of the present invention, the method 300 may be carried out by, for example, a BS, a Baseband Unit (BBU) pool, a controller, a server or any other suitable device in the multicell network.

At step S301, CSI on channels relating to D2D pair and a plurality of cellular users that potentially share resources with the D2D pair is acquired.

According to embodiments of the present invention, the method 300 may be implemented under the framework of a C-RAN, as shown in FIG. 1. The C-RAN may comprise one or more BBUs (a BBU pool) and a plurality of RRUs, which may connected via optical transport network. The plurality of RRUs may manage multiple cells and transmit, receive and/or measure signals in respective cells. The BBU pool may control, manage and/or coordinate operations of the plurality of RRUs. In some embodiments, the method 300 may be implemented at the BBUs, which will be discussed in detail in connection to embodiments shown in FIG. 4.

It is to be noted that, besides the C-RAN framework, the method according to embodiments of the present invention may be implemented in other suitable network, for example, in a conventional multicell network, which will be discussed in detail in connection to embodiments shown in FIG. 5.

In embodiments of the present invention, a plurality of cellular users located in multiple cells may potentially share resources with the D2D pair. For example, in the case that the D2D pair reuses physical resources of cellular users in adjacent BSs along with local BS, the cellular users in adjacent BSs will potentially share resources with the D2D pair.

According to embodiments of the present invention, the CSI (channel state information) may comprise channel gains from the plurality of cellular users to their respective BSs, channel gains from the plurality of cellular users to D2D receiver in the D2D pair, channel gains from D2D transmitter in the D2D pair to the D2D receiver, and channel gains from the D2D transmitter to the BSs, and so on.

According to embodiments of the present invention, the CSI on channels relating to D2D pair and a plurality of cellular users that potentially share resources with the D2D pair may be acquired by several means. For example, the CSI may be obtained by BBUs from a plurality of RRUs managing the plurality of cellular users, e.g., via Common Public Radio Interface (CRPI). For another example, the CSI may be obtained by a local BS from BSs managing the plurality of cellular users.

In some embodiments of the present invention, all the information comprised in the CSI may be obtained by the local BS. In some other embodiments, the local BS just obtain part of the information comprised in the CSI, the remaining information comprised in the CSI may be collected by adjacent BSs. According to embodiments of the present invention, the channel gains from D2D transmitter to the D2D receiver may be obtained by a local BS, and the channel gains from the plurality of cellular users to their respective BSs, the channel gains from the plurality of cellular users to the D2D receiver, and the channel gains from the D2D transmitter to the BSs may be collected by BSs managing the plurality of cellular users.

At step S302, D2D transmit powers of the D2D pair on a plurality of frequency bands allocated to the plurality of cellular users and cellular transmit powers of the plurality of cellular users are determined based on the CSI, to improve throughput of the multicell network.

According to embodiments of the present invention, the D2D transmit powers and the cellular transmit powers may be determined at the BBUs. In these embodiments, the D2D transmit powers and the cellular transmit powers may be determined by steps of: obtaining cellular weights of the plurality of cellular users and D2D weights of the D2D pair; calculating candidates of D2D transmit powers and cellular transmit powers based on the CSI, the cellular weights and the D2D weight, upper limits of the D2D transmit powers and power budgets of the plurality of cellular users; calculating a candidate difference between the calculated candidates and previous candidates; in response to that the candidate difference is less than a predetermined threshold, determining the calculated candidates as the D2D transmit powers and the cellular transmit powers; and in response to that the candidate difference is not less than a predetermined threshold, calculating upper limits of the D2D transmit powers based on the calculated candidates of D2D transmit powers and cellular transmit powers, so as to iteratively calculate the candidates of D2D transmit powers and cellular transmit powers. According to embodiments of the present invention, the upper limits of the D2D transmit powers may be calculated based on the calculated candidates of D2D transmit powers and cellular transmit powers by: calculating upper limits of the D2D transmit powers based on the calculated candidates of D2D transmit powers and cellular transmit powers under a constraint that a sum of the upper limits is less than or equal to total transmit power of the D2D communication; calculating an upper limit difference between the calculated upper limits and previous upper limits; in response to that the upper limit difference is less than a predetermined threshold, determining the calculated candidates as the D2D transmit powers and the cellular transmit powers; and in response to that the upper limit difference is not less than a predetermined threshold, updating upper limits of the D2D transmit powers with the calculated upper limits, so as to iteratively calculate the candidates of D2D transmit powers and cellular transmit powers.

According to embodiments of the present invention, the D2D transmit powers and the cellular transmit powers may be determined at the local BS. In these embodiments, the D2D transmit powers and the cellular transmit powers may be determined by steps of: obtaining cellular weights of the plurality of cellular users and D2D weights of the D2D pair; calculating candidates of the D2D transmit powers and the cellular transmit powers based on the CSI, the cellular weights and the D2D weight, a power price and power budgets of the plurality of cellular users, wherein the power price are determined according to a search interval; in response to that the search interval is less than a predetermined threshold, determining the calculated candidates as the D2D transmit powers and the cellular transmit powers; and in response to that the search interval is not less than a predetermined threshold, updating the search interval based on the power price, so as to iteratively calculate the candidates of D2D transmit powers and cellular transmit powers.

According to embodiments of the present invention, the D2D transmit powers and the cellular transmit powers may be determined at the local BS. In these embodiments, the local BS collaborates with the adjacent BSs, specifically, the cellular transmit powers may be determined at the BSs managing the plurality of cellular users, and the D2D transmit powers may be determined at the local BS.

According to embodiments of the present invention, the cellular weights and the D2D weights may be set or adjusted according to service priorities of the plurality of cellular users and the D2D pair. For example, if the priorities of the D2D pair using the N frequency bands are higher than the priorities of the cellular users, each of the D2D weights may be set as 0.7 and each of the cellular weights may be set as 0.3. For another example, if the priorities of the D2D pair and the cellular users are equal, each of the D2D weights may be set as 0.5 and each of the cellular weights may be set as 0.5. It is to be noted that, the cellular weights may be set as a single value or set as different values. Likewise, the D2D weights may also be set as a single value or different values. It is also to be noted that the illustrated values for the D2D weights and the cellular weight are just examples, and those skilled in the art may set different values for the weights according to the communication conditions, implementation requirements, and/or other practical factors.

Figure 4:
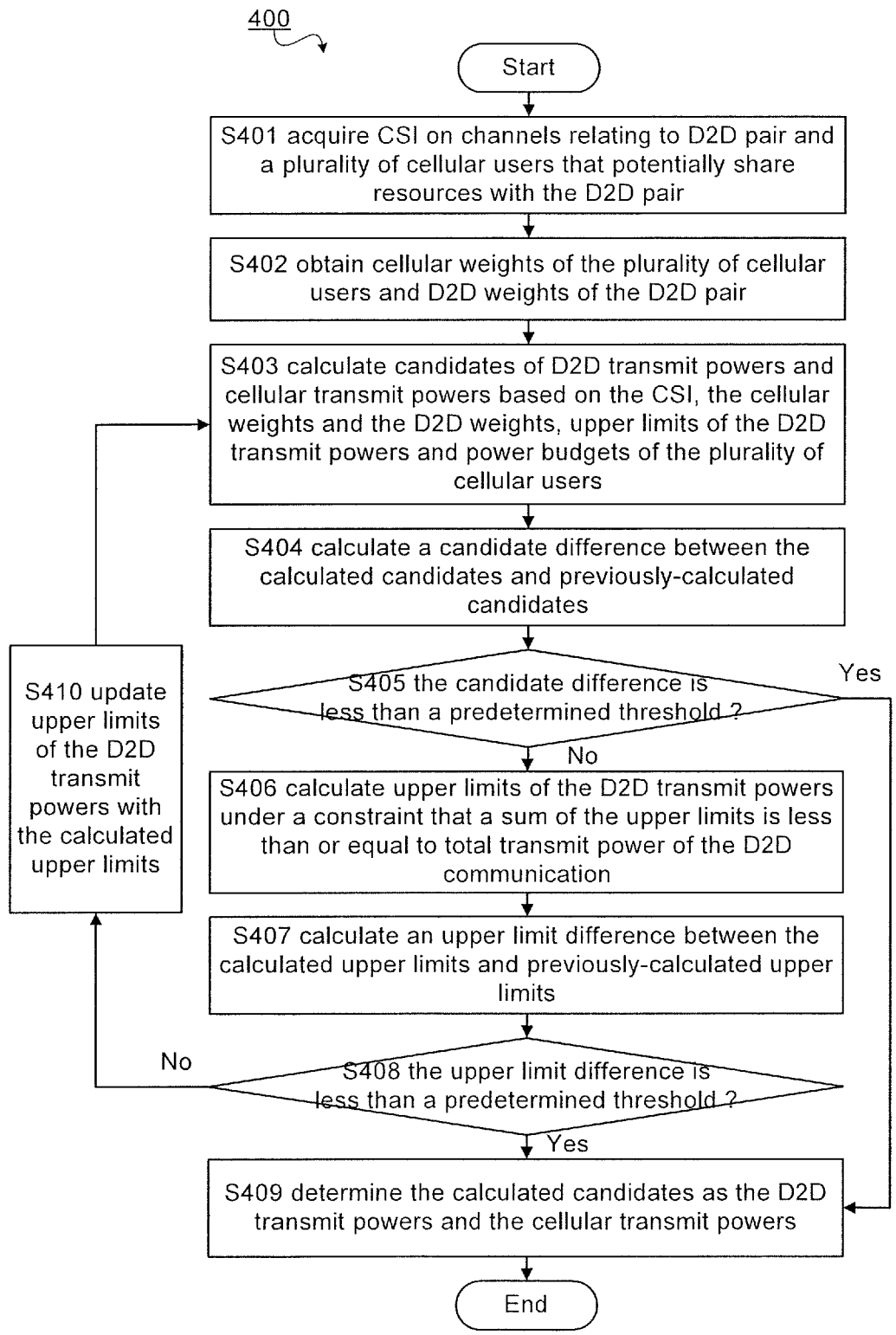
FIG. 4 illustrates a flow chart of a method 400 for resource sharing for D2D and cellular communications in C-RAN according to embodiments of the invention.

Reference is now made to FIG. 4, which illustrates a flow chart of a method 400 for resource sharing for D2D and cellular communications in C-RAN according to embodiments of the invention. The method 400 may be considered as an embodiment of method 300 described above with reference to FIG. 3. In the following description of method 400, a C-RAN arrangement is employed and the method is performed at BBUs, i.e., a BBU pool. A plurality of cellular users located in multiple cells managed by multiple RRUs may potentially share resources with the D2D pair located in a local RRU. However, it is noted that this is only for the purpose of illustrating the principles of the present invention, rather than limiting the scope thereof.

Figure 7:
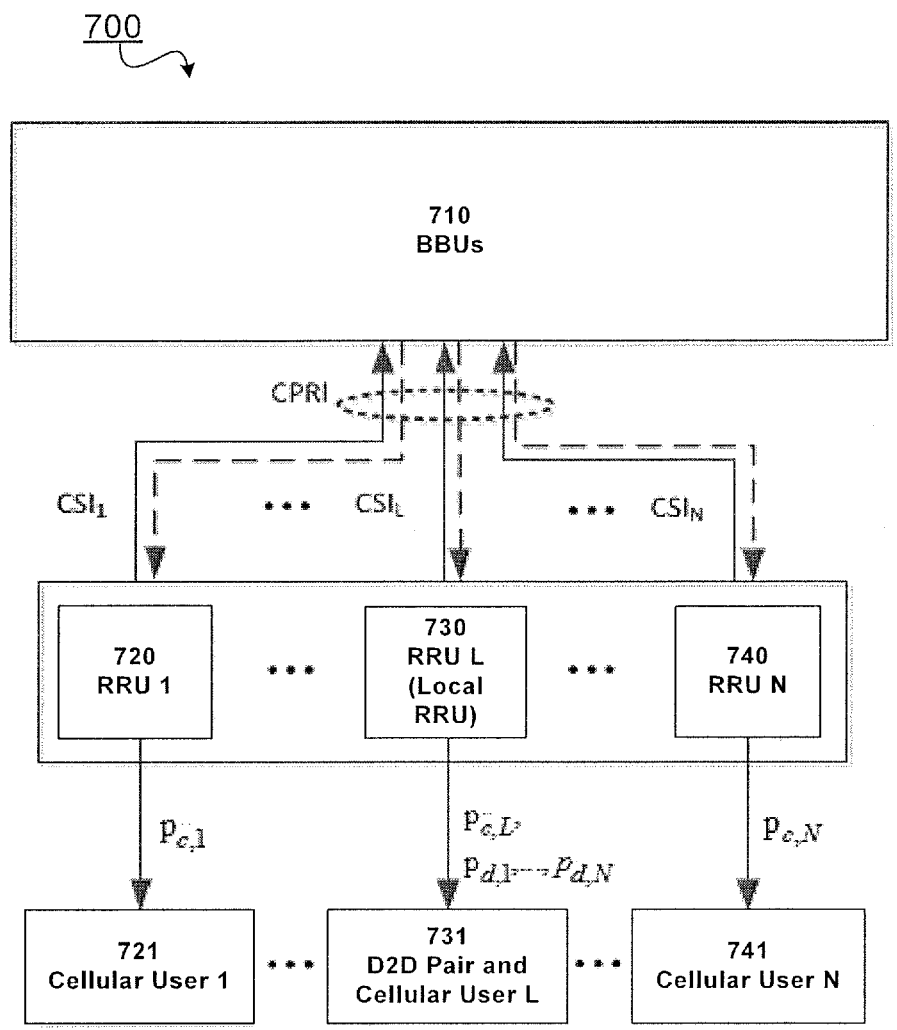
FIG. 7 illustrates a schematic diagram of a C-RAN 700 employing methods for resource sharing for D2D and cellular communications according to some embodiments of the invention.

To better understand the embodiments of the present invention, the C-RAN shown in FIG. 7 is taken into consideration. FIG. 7 illustrates a schematic diagram of a C-RAN 700 employing methods for resource sharing for D2D and cellular communications according to some embodiments of the invention. The C-RAN 700 comprises a plurality of RRUs (e.g., 720, 730, 740) coordinated by a BBU pool (BBUs 710), wherein the Lth RRU 730 is the local RRU. Each RRU i (i=1, . . . , L, . . . , N) serves a cellular user (CU), denoted by CU i, and a frequency band B, is allocated for uplink communication (multiple users in each cell may be readily incorporated in this work) in the cell of RRU i. The plurality of CUs may randomly locate within the local cell and N−1 adjacent cells and are scheduled to share resources with the D2D pair. Therefore, a plurality of cellular users that potentially share resources with the D2D pair may be determined. The transmit power $(p_{c,i})$ of each CU i has a power budget $P_{c,i}$, that is $p_{c,i} \leq P_{c,i}$. The sum of transmit powers $(p_{d,i})$ of the D2D link on all N frequency bands is limited by another power budget $P_d$, that is, $\sum_{i=1}^{n} p_{d,i} \leq P_d$.

At step S401, CSI on channels relating to D2D pair and a plurality of cellular users that potentially share resources with the D2D pair is acquired.

Similar with step S301 of method 300, step S401 in method 400 also acquires CSI on channels relating to D2D pair and a plurality of cellular users that potentially share resources with the D2D pair.

As shown in FIG. 7, the BBUs 710 acquire $CSI_1$, . . . $CSI_L$, . . . $CSI_N$ from RRU 1, . . . , RRU L, . . . , RRU N, respectively. The $CSI_i$ (i=1, . . . , L, . . . , N) may comprise several types of channel gains, for example, channel gains from the plurality of cellular users to their respective BSs, denoted as $a_i$; channel gains from the plurality of cellular users to D2D receiver in the D2D pair, denoted as $b_i$; channel gains from D2D transmitter in the D2D pair to the D2D receiver, denoted as $c_i$; and channel gains from the D2D transmitter to the BSs, denoted as $d_i$, where i=1, 2, . . . , N, and N denotes the number of the plurality of cellular users. It is to be noted that the above four types of channel gains are illustrated for example, and those skilled in the art will understand that the CSI may comprise further information regarding the channels of the D2D pair and the cellular users.

According to embodiments of the present invention, each of $a_i$, $b_i$, $c_i$ and $d_i$ may comprise information regarding pathloss, shadow fading, small-scale fading, and so on. In some embodiments, $a_i$, $b_i$, $c_i$ and $d_i$ may be calculated as:

$$a_i = |h_{cb,i}|^2 / \sigma_{b,i}$$
$$b_i = |h_{db,i}|^2 / \sigma_{b,i}$$
$$c_i = |h_{dd,i}|^2 / \sigma_{d,i}$$
$$d_i = |h_{cd,i}|^2 / \sigma_{d,i} \quad (1)$$

where $\sigma_{d,i}$ indicates noise power at the D2D receiver;

$\sigma_{b,i}$ indicates noise power at the ith BS (BS i);

$h_{cb,i}$ indicates the channel from CU i to BS i;

$h_{db,i}$ indicates the channel from the D2D transmitter to BS i on $B_i$;

$h_{dd,i}$ indicates the channel from the D2D transmitter to its receiver on $B_i$;

$h_{cd,i}$ indicates the channel from CU i to the D2D receiver on $B_i$; and $B_i$ indicates the frequency band i of BS i.

In C-RAN, the CSI may be collected at the RRUs and then the BBUs obtain the CSI from the RRU. The CSI may be reported from the RRUs to the BBUs, e.g., via CPRI, when the BBUs requests for the CSI.

At step S402, cellular weights of the plurality of cellular users and D2D weights of the D2D pair are obtained.

According to embodiments of the present invention, the cellular weights and the D2D weights may be set by the BBUs, or may be obtained by the BBUs from a storage in which the cellular weights and the D2D weights have been set. As discussed above, the cellular weights and the D2D weights may be set according to service priorities of the plurality of cellular users and the D2D pair.

In the embodiments illustrated with FIG. 4, the cellular weights of the plurality of cellular users may be denoted as $\alpha_i$ and the D2D weights of the D2D pair may be denoted as $\beta_i$, where i=1, 2, . . . , N, and N denotes the number of the plurality of cellular users. It is to be noted that since there are N cellular users that potentially sharing resources with the D2D pair, there are N cellular weights for the N cellular users. Further, since the D2D pair may share resources (e.g., frequency bands) with the N cellular users, the D2D pair may have N D2D weights, each of which relates to resource sharing with one of the N cellular users.

At step S403, candidates of D2D transmit powers and cellular transmit powers are calculated based on the CSI, the cellular weights and the D2D weights, upper limits of the D2D transmit powers and power budgets of the plurality of cellular users.

According to embodiments of the present invention, the candidates of D2D transmit powers and cellular transmit powers may be calculated in several ways. For example, the candidates may be first calculated based on the CSI, the cellular weights and the D2D weight, and upper limits of the D2D transmit powers. If the calculated candidates are not good enough, the upper limits of the D2D transmit powers may be updated, and then the candidates of D2D transmit powers and cellular transmit powers may be calculated again in a next loop based on the updated upper limits, until the calculated candidates are good enough. Meanwhile, during the updating of the upper limits, if the upper limits are good enough, the iteration may be stopped and the currently calculated candidates may be determined as the final results of the D2D transmit powers and the cellular transmit powers.

According to embodiments of the present invention, the finally determined D2D transmit powers are denoted as "$p_{d,i}$" and the finally determined cellular transmit powers are denoted as "$p_{c,i}$", wherein i=1, ..., L, ..., N. Additionally, the candidates of D2D transmit powers are denoted as "$p_{d,i}^*$" and the candidates of cellular transmit powers are denoted as "$p_{c,i}^*$", wherein i=1, ... L, ..., N.

In the kth loop of the iteration, the candidates $(p_{d,i}^*, p_{c,i}^*)$ of D2D transmit powers and cellular transmit powers may be calculated as follows:

Let $u_i \triangleq [(\alpha_i - \beta_i)a_i P_{c,i} - 2\beta_i]/2\beta_i b_i$, $v_i \triangleq a_i P_{c,i}[(\alpha - \beta_i)^2 a_i c_i P_{c,i} + 4\alpha_i \beta_i (b_i d_i P_{c,i} + b_i - c_i)]/4\beta_i^2 b_i^2 c_i$.

$x_i \triangleq u_i - \sqrt{v_i}$, if $v_i > 0$, $\Omega \triangleq \{(p_{c,i}, p_{d,i}) \mid (0, t_i(k)), (P_{c,i}, 0), (P_{c,i}, t_i(k)), (P_{c,i}[x_i]_0^{t_i(k)})\}$;

if $v_i \leq 0$, $\Omega \triangleq \{(p_{c,i}, p_{d,i}) \mid (0, t_i(k)), (P_{c,i}, t_i(k))\}$.

$(p_{c,i}^*(k), p_{d,i}^*(k)) = \underset{\Omega}{\mathrm{argmax}}\left\{\alpha_i \log\left(1 + \frac{a_i p_{c,i}}{1 + b_i p_{d,i}}\right) + \beta_i \log\left(1 + \frac{c_i p_{d,i}}{1 + d_i p_{c,i}}\right)\right\}$ wherein, k indicates the number of the loops in the iteration; $P_{c,i}$ (i=1, ..., L, ..., N) represents the power budgets of the plurality of cellular users; and $t_i(k)$ indicates the upper limits of the D2D transmit powers on the ith frequency band in the kth loop, wherein $t_i(k)$ may be a N-dimensional vector. At the beginning of determination of the D2D transmit powers and the cellular transmit powers, k is initialized as "0" and incremented by 1 after a loop.

At step S404, a candidate difference between the calculated candidates and previous candidates is calculated.

As discussed above, the candidates of the D2D transmit powers and the cellular transmit powers may be calculated iteratively, until good results are obtained. For example, the candidates may be initialized as predetermined values at the beginning of the method according to embodiments of the present invention. As such, at step S404, the currently-calculated candidates may be compared with the previous candidates, wherein the previous candidates may be the initialized candidates or the previous candidates may be the candidates calculated in the last loop. Thus, the candidate difference between the currently-calculated candidates and previous candidates may be calculated.

At step S405, whether the candidate difference is less than a predetermined threshold is determined.

As can be appreciated by those skilled in the art, the predetermined threshold is configurable. Those skilled in the art may predefine or preset the threshold according to his/her experience, system conditions, historical values and/or other factors.

If the candidate difference is less than the predetermined threshold, the flow goes to step S409 and the currently-calculated candidates are determined as the finally determined D2D transmit powers and the cellular transmit powers; otherwise, it may be determined that the currently-calculated candidates are not good enough, thus the flow goes to step S406.

At step S406, upper limits of the D2D transmit powers are calculated based on the calculated candidates of D2D transmit powers and cellular transmit powers under a constraint that a sum of the upper limits is less than or equal to total transmit power of the D2D communication.

As discussed above, $t_i(k)$ indicates the upper limits of the D2D transmit powers on the ith frequency band in the kth loop. In the kth loop, $t_i(k+1)$ may be calculated based on the candidates $(p_{c,i}^*(k), p_{d,i}^*(k))$ of D2D transmit powers and cellular transmit powers calculated at step S403. $\tau(k)$ is the diminishing step size, specified by $$\delta \frac{k}{b+k},$$

wherein $\delta$ is predefined value and b is an predefined integer. In some embodiments, the upper limits $t_i(k+1)$ may be calculated as below:

Compute $h_i'(t_i(k))$ for $i=1, \ldots, N$:

$h_i'(t_j) = \begin{cases} \dfrac{\beta_i c_i}{1 + d_i p_{c,i}^*(k) + c_i p_{d,i}^*(k)} - \dfrac{\alpha_i a_i b_i p_{c,i}^*(k)}{(1 + b_i p_{d,i}^*(k))^2 +} , & \text{for } p_{d,i}^*(k) = t_i(k) \\ \quad\quad a_i p_{c,i}^*(k)(l + b_i p_{d,i}^*(k)) & \\ 0, & \text{for } p_{d,i}^*(k) \neq t_i(k) \end{cases}$ Projection:

With $d(t(k)) = [h_1'(t_1(k)), \ldots, h_n'(t_n(k))]^T$ and $z(k) = t(k) + \tau(k)d(t(k))$, We get $t_i(k+1) = [z_i(k) - \theta]_+$ for $i=1, \ldots, N$, where $[x]_+ = \begin{cases} x, & x \geq 0 \\ 0, & x < 0 \end{cases}$, and $\theta \geq 0$ is the minimum value such that $$\sum_{i=1}^n t_i(k+1) \leq P_d.$$

It is to be noted that the upper limits of the D2D transmit powers may be either calculated by a method named "projection" illustrated above, or calculated by any other suitable method. The above equations are provided for illustration, rather than limitation.

At step S407, an upper limit difference between the calculated upper limits and previous upper limits is calculated.

According to embodiments of the present invention, the upper limits may be calculated iteratively, until results good enough are obtained. For example, the upper limits may be initialized as predetermined values at the beginning of the method 400. As such, at step S407, the currently-calculated upper limits may be compared with the previous upper limits, wherein the previous candidates may be the initialized upper limits (i.e., the predetermined values) or the previous candidates may be the upper limits calculated in the last loop. Thus, the difference between the currently-calculated upper limits and previous upper limits may be calculated.

At step S408, whether the upper limit difference is less than a predetermined threshold is determined.

In embodiments of the present invention, the predetermined threshold is configurable. Those skilled in the art may predefine or preset the threshold according to his/her experience, system conditions, historical values and/or other factors.

If the upper limit difference is less than the predetermined threshold, the flow goes to step S409 and the currently-calculated candidates are determined as the finally determined D2D transmit powers and the cellular transmit powers; otherwise, the flow goes to step S410 to enter a next loop.

At step S409, the calculated candidates are determined as the D2D transmit powers and the cellular transmit powers. In this way, the calculated candidates may be considered as the finally determined D2D transmit powers and cellular transmit powers.

At step S410, upper limits of the D2D transmit powers are updated with the calculated upper limits calculated at step S406. Then, the flow goes to step S403 to perform the next loop.

In accordance with embodiments of the As shown in FIG. 7, the finally-determined D2D transmit powers and the cellular transmit powers, $p_{d,i}$ and $p_{c,i}$, i=1, ..., L, ..., N, may be sent from the BBUs 710 to RRUs. Specifically, the BBUs 710 may send the cellular transmit power $p_{c,i}$ the ith RRU, e.g., send $p_{c,1}$ to RRU 1 720, send $p_{c,L}$ to RRU L 730, and send $p_{c,N}$ to RRU N 740. Additionally, with respect to the RRU L 730, which is the local RRU, the BBUs 710 may further send the D2D transmit powers $p_{d,1}, \ldots p_{d,N}$ (i.e., $p_{d,i}$, i=1, ..., L, ..., N) to RRU L 730. Thereafter, the RRUs may forward the cellular transmit powers to their respective cellular users and the local RRU may further forward the D2D transmit powers to the D2D pair. For example, as shown in FIG. 7, RRU 1 serves cellular user 1, thus when the RRU 1 720 receives $p_{c,1}$ from the BBUs 710, it may forward $p_{c,1}$ to cellular user 1 721; and RRU N serves cellular user N, thus when the RRU N 740 receives $p_{c,N}$ from the BBUs 710, it may forward $p_{c,N}$ to cellular user N 741. Likewise, RRU L serves cellular user L, thus when the RRU L 730 receives $p_{c,L}$ from the BBUs 710, it may forward $p_{c,L}$ to cellular user L 731. Meanwhile, since RRU L is the local RRU, it also send the D2D transmit powers $p_{d,1}, \ldots p_{d,N}$ to the D2D pair located in its cell.

Figure 5:
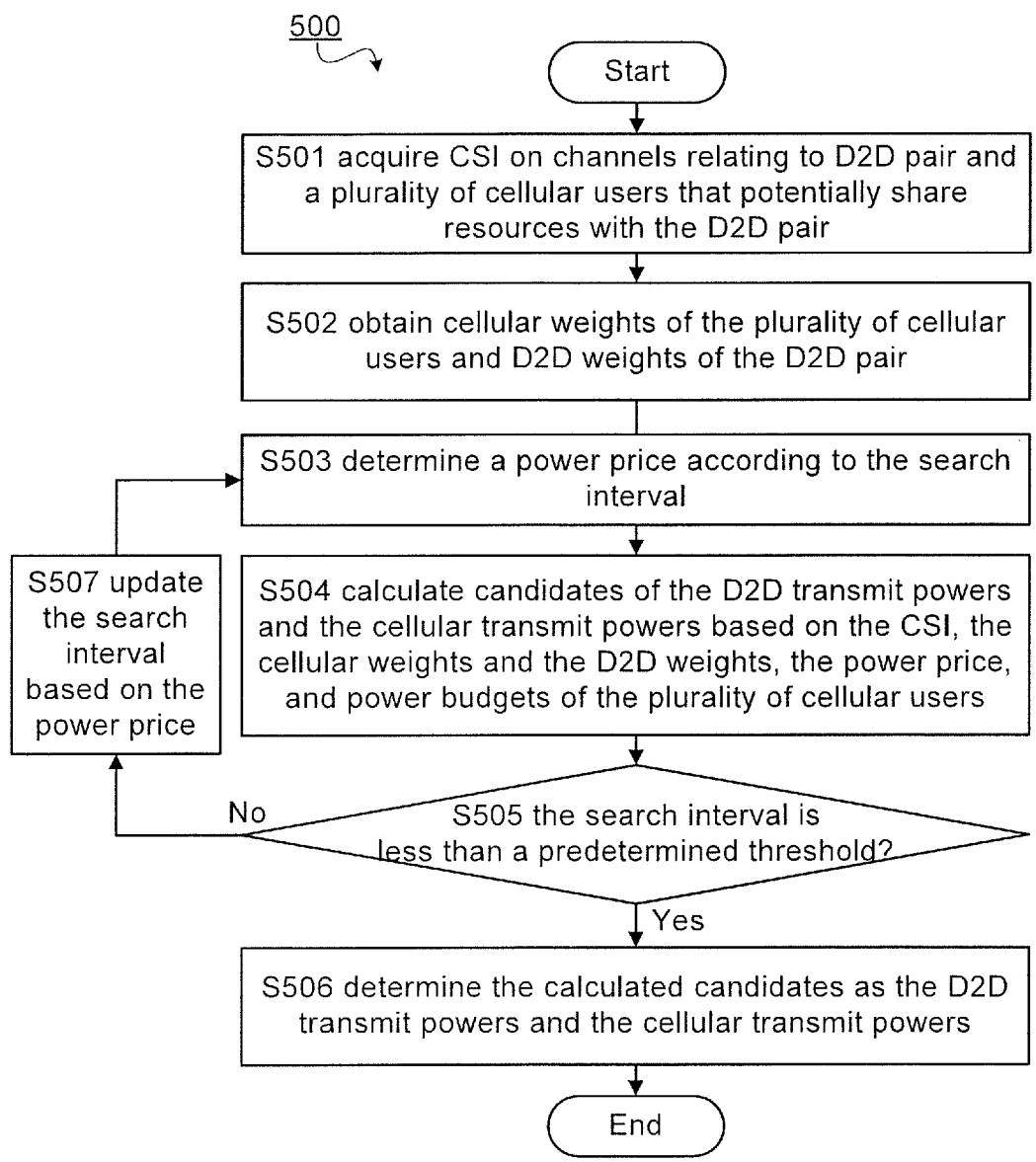
FIG. 5 illustrates a flow chart of a method 500 for resource sharing for D2D and cellular communications in a conventional multicell network according to embodiments of the invention.

Reference is now made to FIG. 5, which illustrates a flow chart of a method 500 for resource sharing for D2D and cellular communications in a conventional multicell network according to embodiments of the invention. The method 500 may be considered as an embodiment of method 300 described above with reference to FIG. 3. In the following description of method 500, a conventional multicell network is employed and the method 500 is performed at the local BS. A plurality of cellular users located in multiple cells managed by multiple BSs may potentially share resources with the D2D pair located in the local BS. However, it is noted that this is only for the purpose of illustrating the principles of the present invention, rather than limiting the scope thereof. Those skilled in the art will appreciate that the method 500 may be also implemented at any suitable BS or controller in the multicell network.

Figure 8:
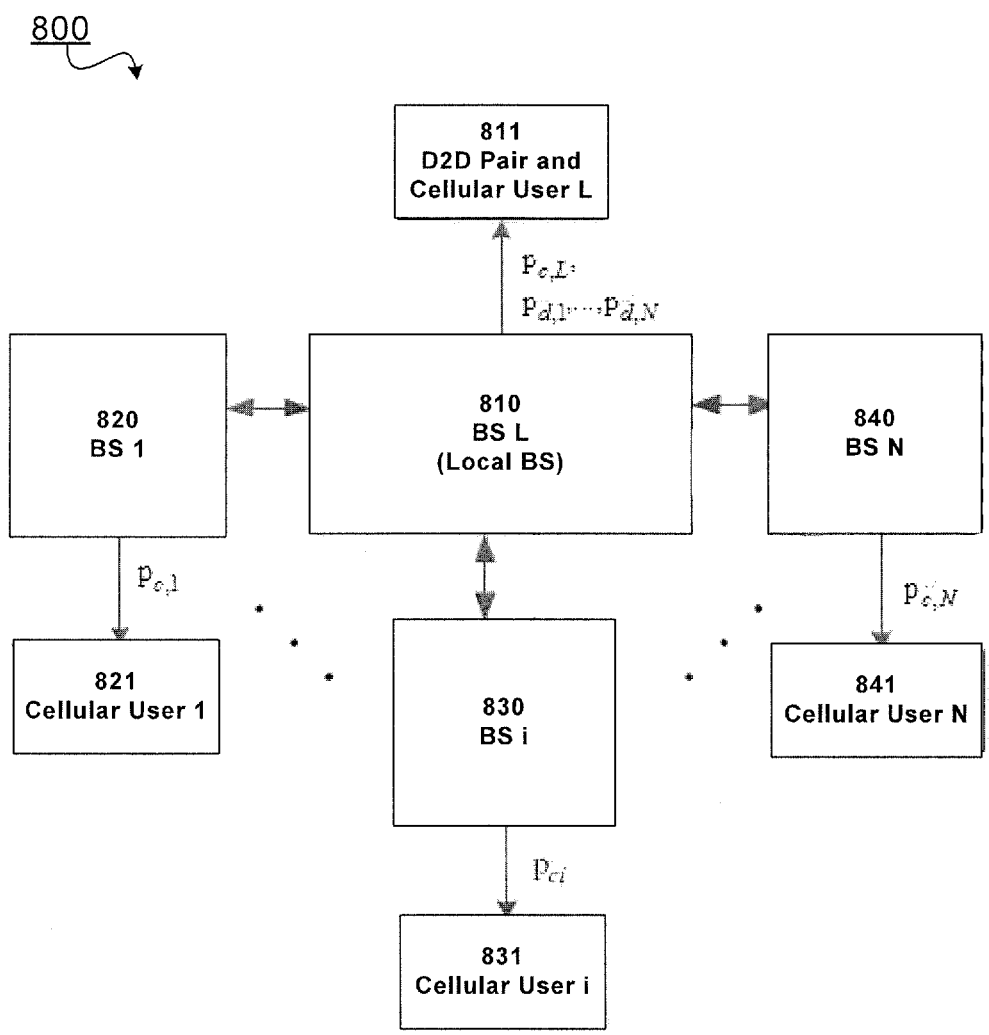
FIG. 8 illustrates a schematic diagram of a conventional multicell network 800 employing methods for resource sharing for D2D and cellular communications according to some embodiments of the invention.

To better understand the embodiments of the present invention, the conventional multicell network shown in FIG. 8 is taken into consideration. FIG. 8 illustrates a schematic diagram of a conventional multicell network 800 employing methods for resource sharing for D2D and cellular communications according to some embodiments of the invention. The multicell network 800 comprises N BSs (810, 820, 830, 840) coordinated by a network center, wherein the BS L 810 is the local BS and the D2D pair is located in the cell managed by BS L 810. Each BS i (i=1, ..., L, ..., N) serves a cellular user (CU), e.g., cellular user 1, cellular user i, cellular user L, cellular user N, etc. A dedicated frequency band $B_i$ is allocated for uplink communication (multiple users in each cell may be readily incorporated in this work) in the cell of BS i. The transmit power ($p_{c,i}$) of each CU has a power budget of CU (denoted as $P_{c,i}$), that is $p_{c,i} \leq P_{c,i}$. The sum of transmit powers ($p_{d,i}$) of the D2D link on all N frequency bands is limited by the power budget of the D2D communication (denoted as $P_d$), that is, $\Sigma_{i=1}^{n} p_{d,i} \leq P_d$. According to embodiments, $p_{d,i}$ indicates the transmit power of the D2D transmitter on the ith frequency band, and $p_{c,i}$ indicates the transmit power of the ith CU.

At step S501, CSI on channels relating to D2D pair and a plurality of cellular users that potentially share resources with the D2D pair is acquired.

Similar with step S301 of method 300, step S501 in method 500 also acquires CSI on channels relating to D2D pair and a plurality of cellular users that potentially share resources with the D2D pair.

As shown in FIG. 8, the local BS L 810 may acquires $CSI_1, \ldots CSI_L, \ldots CSI_N$ from $BS_1, \ldots, BS_L, \ldots, BS_N$, respectively. The $CSI_i$ (i=1, ..., L, ..., N) may comprise several types of channel gains, for example, channel gains from the plurality of cellular users to their respective BSs, denoted as $a_i$; channel gains from the plurality of cellular users to D2D receiver in the D2D pair, denoted as $b_i$; channel gains from D2D transmitter in the D2D pair to the D2D receiver, denoted as $c_i$; and channel gains from the D2D transmitter to the BSs, denoted as $d_i$, where i=1, 2, ..., N, and N denotes the number of the plurality of cellular users. It is to be noted that the above four types of channel gains are illustrated for example, and those skilled in the art will understand that the CSI may comprise further information regarding the channels of the D2D pair and the cellular users.

According to embodiments of the present invention, each of $a_i$, $b_i$, $c_i$ and $d_i$ may comprise information regarding pathloss, shadow fading, small-scale fading, and so on. In some embodiments, $a_i$, $b_i$, $c_i$ and $d_i$ may be calculated according to equation (1).

In the conventional multicell network, the channel gains $c_i$ may be obtained by the local BS, and the channel gains $a_i$, $b_i$, and $d_i$ may be collected by adjacent BSs managing the plurality of cellular users. According to some embodiments, in the case that all the D2D transmit powers and the cellular transmit powers are determined at the local BS, the local BS may request for the channel gains $a_i$, $b_i$, and $d_i$ from the adjacent BSs, so as to acquire the channel state information comprising $a_i$, $b_i$, $c_i$ and $d_i$.

According to embodiments of the present invention, the signals, such as the CSI, may be transmitted via X2 interface between the local BS and the adjacent BSs (or coordinated BSs). The X2 interface is defined as a direct eNB-to-eNB interface. As such, inter-cell interference coordination (ICIC) techniques such as Fractional frequency reuse (FFR) etc. may be inherited.

At step S502, cellular weights of the plurality of cellular users and D2D weights of the D2D pair are obtained.

According to embodiments of the present invention, the cellular weights and the D2D weights may be set by the local BS, or may be obtained by the local BS from a storage in which the cellular weights and the D2D weights have been set. As discussed above, the cellular weights and the D2D weights may be set according to service priorities of the plurality of cellular users and the D2D pair.

Similar to the embodiments illustrated with FIG. 4, in the embodiments illustrated with FIG. 5, the cellular weights may be denoted as $\alpha_i$ and the D2D weights may be denoted as $\beta_i$, where i=1, 2, . . . , N, and N denotes the number of the plurality of cellular users.

At step S503, a power price is determined according to the search interval.

According to embodiments of the present invention, the candidates of D2D transmit powers and cellular transmit powers may be calculated in several ways. To solve the D2D power constraint nonlinear equation, numerical methods, such as bisection, Newton method, may be employed. It is to be noted that the embodiments of the present invention just take bisection as example, rather than limitation.

In the embodiments, the candidates of D2D transmit powers and cellular transmit powers may be calculated iteratively. For example, in the initialization, a search interval may be defined, for example, as [la, lb], which has the starting point la, ending point lb and a length of (lb−la). In the kth loop of the iteration, the search interval may be updated based on the power price used in the kth loop, and the details may be found in description with respect to step S506.

Based on the search interval, the power price (denoted as $\mu(k)$) may be determined as below:

$$\mu(k)=(la+lb)/2, \quad (2)$$

where k indicates the number of the loops in the iteration, k=0, 1, . . . , K, K is the total number of the loops in the iteration.

At step S504, candidates of the D2D transmit powers and the cellular transmit powers are calculated based on the CSI, the cellular weights and the D2D weights, the power price and power budgets of the plurality of cellular users.

In embodiments of the present invention, the finally determined D2D transmit powers are denoted as "$p_{d,i}$" and the finally determined cellular transmit powers are denoted as "$p_{c,i}$", wherein i=1, . . . , L, . . . , N. Additionally, the candidates of D2D transmit powers are denoted as "$p_{d,i}^*$" and the candidates of cellular transmit powers are denoted as "$p_{c,i}^*$", wherein i=1, . . . , L, . . . , N.

In the kth loop of the iteration, the candidates ($p_{d,i}^*$, $p_{c,i}^*$) of D2D transmit powers and cellular transmit powers may be calculated as follows:

$$p_{d,i}^a = \left[\frac{\beta_i}{\mu(k)} - \frac{1}{c_i}\right]_+, \text{ where } [x]_+ = \begin{cases} x, & x \geq 0 \\ 0, & x < 0 \end{cases};$$

$$p_{d,i}^b \triangleq \text{argmax}_m f_i(P_{c,i}, [x_m]_+, \mu(k)),$$

$\{x_m\}_{m \leq 3}$ are real roots of the cubic equation $$A_i x^3 + B_i x^2 + C_i x + D_i = 0$$

and $$f_i(P_{c,i}, P_{d,i}, \mu(k)) \triangleq$$

$$\alpha_i \log\left(1 + \frac{a_i p_{c,i}}{1 + b_i p_{d,i}}\right) + \beta_i \log\left(1 + \frac{c_i p_{d,i}}{1 + d_i p_{c,i}}\right) - \mu(k) p_{d,i},$$

where $$A_i \triangleq \mu(k) b_i^2 c_i [(\alpha_i - \beta_i) a_i P_{c,i} - 2\beta_i]/2\beta_i$$

$$B_i \triangleq \mu(k) b_i c_i (2 + a_i P_{c,i}) + \mu(k) b_i^2 (1 + d_i p_{c,i}) - \beta_i b_i^2 c_i$$

$$C_i \triangleq \mu(k) b_i (2 + a_i P_{c,i})(1 + d_i P_{c,i}) +$$
$$\mu(k) c_i (1 + a_i P_{c,i}) + (\alpha_i - \beta_i) a_i b_i c_i P_{c,i} - 2\beta_i b_i c_i$$

$$D_i \triangleq \mu(k)(1 + a_i P_{c,i})(1 + d_i P_{c,i}) + \alpha_i a_i b_i P_{c,i}(1 + d_i P_{c,i}) - \beta_i c_i (1 + a_i P_{c,i})$$

If $f_i(0, p_{d,i}^q, \mu(k)) \geq f_i(P_{c,i}, p_{d,i}^b, \mu(k))$, $(p_{c,i}^*(k), p_{d,i}^*(k)) = (0, p_{d,i}^a)$, otherwise, $(p_{c,i}^*(k), p_{d,i}^*(k)) = (P_{c,i}, p_{d,i}^b)$, where $P_{c,i}$ (i=1, . . . , L, . . . , N) represents the power budgets of the plurality of cellular users.

At step S505, whether the search interval is less than a predetermined threshold is determined.

As can be appreciated by those skilled in the art, the predetermined threshold is configurable. Those skilled in the art may predefine or preset the threshold according to his/her experience, system conditions, historical values and/or other factors.

In some embodiments, the length of the search interval may be first calculated, e.g., by calculating an absolute value between the starting point la and the ending point lb. If the length of the search interval is larger than a predetermined threshold, e.g., denoted as $\epsilon$, the flow goes to step S506 and the currently-calculated candidates are determined as the finally determined D2D transmit powers and the cellular transmit powers; otherwise, the flow goes to step S507 to enter a next loop.

At step S506, the calculated candidates are determined as the D2D transmit powers and the cellular transmit powers. In this way, the calculated candidates may be considered as the finally determined D2D transmit powers $p_{d,i}$ and cellular transmit powers $p_{c,i}$.

At step S507, the search interval is updated based on the power price.

As discussed above, in the kth loop of the iteration, the search interval may be updated based on the power price used in the kth loop. In embodiments of the present invention, the search interval may be updated in several ways. For example, the following equation (3) may be performed:

$$s(\mu(k))=P_d - \sum_{i=1}^{N} p_{d,i}^*(k) \quad (3)$$

where in the $s(\mu(k))$ is an intermediate value. Then, the $s(\mu(k))$ may be compared with a predetermined threshold, e.g, 0. If $s(\mu(k))$ is less than the predetermined threshold, then the ending point lb is updated with $\mu(k)$; and if $s(\mu(k))$ is not less than the predetermined threshold, then the starting point la is updated with $\mu(k)$. With the updated la or lb, the power price ($\mu$) may be updated with a new value of (la+lb)/2.

According to alternative embodiments of the present invention, the method 300 or 500 may be implemented in a distributed manner. In some embodiments, during the process of CSI acquiring, the Local BS may acquire channel gains from D2D transmitter to D2D receiver on N bands. And then, the local BS may report channel gain on the ith band to the ith BS. All of the BSs (BS i, i=1, 2, . . . N) including the local BS and the adjacent BSs need to acquire channel gains $a_i$, $b_i$, and $d_i$. During the process of determination of the D2D transmit powers and the cellular transmit powers, the candidates of D2D transmit powers and cellular transmit powers on each band i may be calculated by respective adjacent BSs based on the CSI, the cellular weights and the D2D weight, power price and power budgets of the plurality of cellular users. The adjacent BSs may report the candidates of D2D transmit powers and cellular transmit powers to the local BS. According to the reported candidates of D2D transmit powers, local BS judges whether to update the search interval to adjust the power price.

It is to be noted that, in the disclosure, the adjacent BSs refer to the BSs serve the plurality of cellular users that potentially share resources with the D2D pair, and the local BS is the BS manages a cell in which the D2D pair is located In accordance with embodiments of the present invention, based on the determined D2D transmit powers and the cellular transmit powers, the weighted sum rate may be calculated by $$\sum_{i=1}^{N} \alpha_i \log\left(1 + \frac{a_i p_{c,i}}{1 + b_i p_{d,i}}\right) + \beta_i \log\left(1 + \frac{c_i p_{d,i}}{1 + d_i p_{c,i}}\right). \quad (4)$$

In view of the above, the proposed solution may maximize the weighted sum rate of the cellular and D2D users, thus the throughput of the multicell network is effectively optimized.

Figure 6:
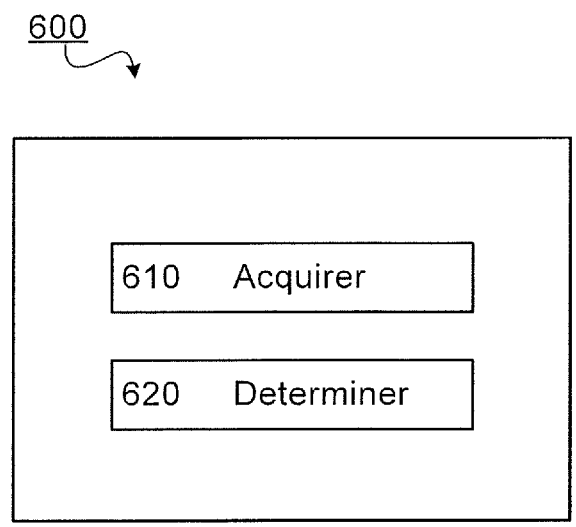
FIG. 6 illustrates a block diagram of an apparatus 600 for resource sharing for D2D and cellular communications in a multicell network according to embodiments of the invention.

Reference is now made to FIG. 6, which illustrates a block diagram of an apparatus 600 for resource sharing for D2D and cellular communications in a multicell network according to embodiments of the invention. As shown, the apparatus 600 comprise: an acquirer 610 configured to acquire channel state information (CSI) on channels relating to D2D pair and a plurality of cellular users that potentially share resources with the D2D pair; and a determiner 620 configured to determine D2D transmit powers of the D2D pair on a plurality of frequency bands allocated to the plurality of cellular users and cellular transmit powers of the plurality of cellular users based on the CSI, to improve throughput of the multicell network. In accordance with embodiments of the present invention, the apparatus 600 may be implemented at a BS, a Baseband Unit (BBU) pool, a controller, a server or any other suitable device.

According to embodiments of the present invention, the acquirer 610 may comprise: a first CSI obtaining unit configured to obtain, by Baseband Units (BBUs), the CSI from a plurality of Remote Radio Units (RRUs) managing the plurality of cellular users via Common Public Radio Interface (CRPI).

According to embodiments of the present invention, wherein the D2D transmit powers and the cellular transmit powers are determined at the BBUs, and the determiner 620 may comprise: a first weight obtaining unit configured to obtain cellular weights of the plurality of cellular users and D2D weights of the D2D pair; a first candidate calculating unit configured to calculate candidates of D2D transmit powers and cellular transmit powers based on the CSI, the cellular weights and the D2D weight, upper limits of the D2D transmit powers and power budgets of the plurality of cellular users; a first difference calculating unit configured to calculate a candidate difference between the calculated candidates and previous candidates; a first determining unit configured to determine, in response to that the candidate difference is less than a predetermined threshold, the calculated candidates as the D2D transmit powers and the cellular transmit powers; and a first limit calculating unit configured to calculate, in response to that the candidate difference is not less than a predetermined threshold, upper limits of the D2D transmit powers based on the calculated candidates of D2D transmit powers and cellular transmit powers, so as to iteratively calculate the candidates of D2D transmit powers and cellular transmit powers.

According to embodiments of the present invention, the first limit calculating unit may comprise: a second limit calculating unit configured to calculate upper limits of the D2D transmit powers based on the calculated candidates of D2D transmit powers and cellular transmit powers under a constraint that a sum of the upper limits is less than or equal to total transmit power of the D2D communication; a second difference calculating unit configured to calculate an upper limit difference between the calculated upper limits and previous upper limits; a second determining unit configured to determine, in response to that the upper limit difference is less than a predetermined threshold, the calculated candidates as the D2D transmit powers and the cellular transmit powers; and a first updating unit configured to update, in response to that the upper limit difference is not less than a predetermined threshold, upper limits of the D2D transmit powers with the calculated upper limits, so as to iteratively calculate the candidates of D2D transmit powers and cellular transmit powers.

According to embodiments of the present invention, the acquirer 610 may comprise: a second CSI obtaining unit configured to obtain, by a local BS, the CSI from BSs managing the plurality of cellular users.

According to embodiments of the present invention, the D2D transmit powers and the cellular transmit powers are determined at the local BS, and the determiner 620 may comprise: a second weight obtaining unit configured to obtain cellular weights of the plurality of cellular users and D2D weights of the D2D pair; a second candidate calculating unit configured to calculate candidates of the D2D transmit powers and the cellular transmit powers based on the CSI, the cellular weights and the D2D weight, a power price and power budgets of the plurality of cellular users, wherein the power price are determined according to a search interval; a third determining unit configured to determine, in response to that the search interval is less than a predetermined threshold, the calculated candidates as the D2D transmit powers and the cellular transmit powers; and a second updating unit configured to update, in response to that the search interval is not less than a predetermined threshold, the search interval based on the power price, so as to iteratively calculate the candidates of D2D transmit powers and cellular transmit powers.

According to embodiments of the present invention, the CSI may comprise channel gains from the plurality of cellular users to their respective base stations (BSs), channel gains from the plurality of cellular users to D2D receiver in the D2D pair, channel gains from D2D transmitter in the D2D pair to the D2D receiver, and channel gains from the D2D transmitter to the BSs.

According to embodiments of the present invention, the channel gains from D2D transmitter to the D2D receiver may be obtained by a local BS, and the channel gains from the plurality of cellular users to their respective BSs, the channel gains from the plurality of cellular users to the D2D receiver, and the channel gains from the D2D transmitter to the BSs may be collected by BSs managing the plurality of cellular users.

According to embodiments of the present invention, the cellular transmit powers may be determined at the BSs managing the plurality of cellular users, and the D2D transmit powers may be determined at the local BS.

According to embodiments of the present invention, the cellular weights and the D2D weights may be set according to service priorities of the plurality of cellular users and the D2D pair.

It is noted that the apparatus 600 may be configured to implement functionalities as described with reference to FIGS. 3-5. Therefore, the features discussed with respect to any of methods 300, 400 and 500 may apply to the corresponding components of the apparatus 600. It is further noted that the components of the apparatus 600 may be embodied in hardware, software, firmware, and/or any combination thereof. For example, the components of the apparatus 600 may be respectively implemented by a circuit, a processor or any other appropriate selection device. Those skilled in the art will appreciate that the aforesaid examples are only for illustration not limitation.

In some embodiment of the present disclosure, the apparatus 600 comprises at least one processor. The at least one processor suitable for use with embodiments of the present disclosure may include, by way of example, both general and special purpose processors already known or developed in the future. The apparatus 600 further comprises at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause the apparatus 600 to at least perform according to any of methods 300-500 as discussed above.

Based on the above description, the skilled in the art would appreciate that the present disclosure may be embodied in an apparatus, a method, or a computer program product. In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIGS. 3-5 may be viewed as method steps, and/or as operations that result from operation of computer program code, and/or as a plurality of coupled logic circuit elements constructed to carry out the associated function(s). At least some aspects of the exemplary embodiments of the disclosures may be practiced in various components such as integrated circuit chips and modules, and that the exemplary embodiments of this disclosure may be realized in an apparatus that is embodied as an integrated circuit, FPGA or ASIC that is configurable to operate in accordance with the exemplary embodiments of the present disclosure.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:

1. A method for resource sharing for device-to-device (D2D) and cellular communications in a multicell network, comprising:
    acquiring channel state information (CSI) on channels relating to D2D pair and a plurality of cellular users that potentially share resources with the D2D pair; and
    determining D2D transmit powers of the D2D pair on a plurality of frequency bands allocated to the plurality of cellular users and cellular transmit powers of the plurality of cellular users based on the CSI, to improve throughput of the multicell network, wherein acquiring CSI on channels relating to D2D pair and a plurality of cellular users that potentially share resources with the D2D pair comprises:
obtaining, by Baseband Units (BBUs), the CSI from a plurality of Remote Radio Units (RRUs) managing the plurality of cellular users via Common Public Radio Interface (CPRI), wherein the D2D transmit powers and the cellular transmit powers are determined at the BBUs, and wherein determining D2D transmit powers of the D2D pair on a plurality of frequency bands allocated to the plurality of cellular users and cellular transmit powers of the plurality of cellular users based on the CSI comprises:
obtaining a plurality of cellular weight values associated with the plurality of cellular users and a D2D weight value associated with the D2D pair;
calculating candidates of D2D transmit powers and cellular transmit powers based on the CSI, the plurality of cellular weight values and the D2D weight value, upper limits of the D2D transmit powers, and power budgets of the plurality of cellular users;
calculating a candidate difference between the calculated candidates and previous candidates;
in response to that the candidate difference is less than a first threshold value, determining the calculated candidates as the D2D transmit powers and the cellular transmit powers; and
in response to that the candidate difference is not less than the first threshold value, calculating upper limits of the D2D transmit powers based on the calculated candidates of D2D transmit powers and cellular transmit powers, so as to iteratively calculate the candidates of D2D transmit powers and cellular transmit powers.

2. The method of claim 1, wherein in response to that the candidate difference is not less than the first threshold value, calculating upper limits of the D2D transmit powers based on the calculated candidates of D2D transmit powers and cellular transmit powers comprises:
calculating upper limits of the D2D transmit powers based on the calculated candidates of D2D transmit powers and cellular transmit powers under a constraint that a sum of the upper limits is less than or equal to total transmit power of the D2D communication;
calculating an upper limit difference between the calculated upper limits and previous upper limits;
in response to that the upper limit difference is less than a second threshold value, determining the calculated candidates as the D2D transmit powers and the cellular transmit powers; and
in response to that the upper limit difference is not less than the second threshold value, updating upper limits of the D2D transmit powers with the calculated upper limits, so as to iteratively calculate the candidates of D2D transmit powers and cellular transmit powers.

3. The method of claim 1, wherein acquiring CSI on channels relating to D2D pair and a plurality of cellular users that potentially share resources with the D2D pair comprises:
obtaining, by a local BS, the CSI from BSs managing the plurality of cellular users.

4. The method of claim 3, wherein the D2D transmit powers and the cellular transmit powers are determined at the local BS, and wherein determining D2D transmit powers of the D2D pair on a plurality of frequency bands allocated to the plurality of cellular users and cellular transmit powers of the plurality of cellular users based on the CSI comprises:
obtaining a plurality of cellular weight values associated with the plurality of cellular users and a D2D weight value associated with the D2D pair;
calculating candidates of the D2D transmit powers and the cellular transmit powers based on the CSI, the plurality of cellular weight values and the D2D weight value, a power price and power budgets of the plurality of cellular users, wherein the power price are determined according to a search interval;
in response to that the search interval is less than a threshold value, determining the calculated candidates as the D2D transmit powers and the cellular transmit powers; and
in response to that the search interval is not less than the threshold value, updating the search interval based on the power price, so as to iteratively calculate the candidates of D2D transmit powers and cellular transmit powers.

5. The method of claim 1, wherein the CSI comprises channel gains from the plurality of cellular users to their respective base stations (BSs), channel gains from the plurality of cellular users to D2D receiver in the D2D pair, channel gains from D2D transmitter in the D2D pair to the D2D receiver, and channel gains from the D2D transmitter to the BSs.

6. The method of claim 5, wherein the channel gains from D2D transmitter to the D2D receiver are obtained by a local BS, and the channel gains from the plurality of cellular users to their respective BSs, the channel gains from the plurality of cellular users to the D2D receiver, and the channel gains from the D2D transmitter to the BSs are collected by BSs managing the plurality of cellular users.

7. The method of claim 6, wherein the cellular transmit powers are determined at the BSs managing the plurality of cellular users, and the D2D transmit powers are determined at the local BS.

8. The method of claim 1, wherein the plurality of cellular weight values and the D2D weight value are set according to service priorities of the plurality of cellular users and the D2D pair.

9. An apparatus for resource sharing for device-to-device (D2D) and cellular communications in a multicell network, comprising:
at least one processor configured to execute:
an acquirer configured to acquire channel state information (CSI) on channels relating to D2D pair and a plurality of cellular users that potentially share resources with the D2D pair; and
a determiner configured to determine D2D transmit powers of the D2D pair on a plurality of frequency bands allocated to the plurality of cellular users and cellular transmit powers of the plurality of cellular users based on the CSI, to improve throughput of the multicell network,
wherein the acquirer comprises:
a first CSI obtaining unit configured to obtain, by Baseband Units (BBUs), the CSI from a plurality of Remote Radio Units (RRUs) managing the plurality of cellular users via Common Public Radio interface (CPRI),
wherein the D2D transmit powers and the cellular transmit powers are determined at the BBUs, and the determiner comprises:
a first weight obtaining unit configured to obtain a plurality of cellular weight values associated with the plurality of cellular users and D2D weight value associated with the D2D pair;

a first candidate calculating unit configured to calculate candidates of D2D transmit powers and cellular transmit powers based on the CSI, the plurality of cellular weight values and the D2D weight value, upper limits of the D2D transmit powers, and power budgets of the plurality of cellular users;

a first difference calculating unit configured to calculate a candidate difference between the calculated candidates and previous candidates;

a first determining unit configured to determine, in response to that the candidate difference is less than a first threshold value, the calculated candidates as the D2D transmit powers and the cellular transmit powers; and a first limit calculating unit configured to calculate, in response to that the candidate difference is not less than the first threshold value, upper its of the D2D transmit powers based on the calculated candidates of D2D transmit powers and cellular transmit powers, so as to iteratively calculate the candidates of D2D transmit powers and cellular transmit powers.

10. The apparatus of claim 9, wherein the first limit calculating unit comprises:

a second limit calculating unit configured to calculate upper limits of the D2D transmit powers based on the calculated candidates of D2D transmit powers and cellular transmit powers under a constraint that a sum of the upper limits is less than or equal to total transmit power of the D2D communication;

a second difference calculating unit configured to calculate an upper limit difference between the calculated upper limits and previous upper limits;

a second determining unit configured to determine, in response to that the upper limit difference is less than a second threshold value, the calculated candidates as the D2D transmit powers and the cellular transmit powers; and a first updating unit configured to update, in response to that the upper limit difference is not less than the second threshold value, upper limits of the D2D transmit powers with the calculated upper limits, so as to iteratively calculate the candidates of D2D transmit powers and cellular transmit powers.

11. The apparatus of claim 9, wherein the acquirer comprises:

a second CSI obtaining unit configured to obtain, by a local BS, the CSI from BSs managing the plurality of cellular users.

12. The apparatus of claim 11, wherein the D2D transmit powers and the cellular transmit powers are determined at the local BS, and wherein the determiner comprises:

a second weight obtaining unit configured to obtain a plurality of cellular weight values associated with the plurality of cellular users and a D2D weight value associated with the D2D pair;

a second candidate calculating unit configured to calculate candidates of the D2D transmit powers and the cellular transmit powers based on the CSI, the plurality of cellular weight values and the D2D weight value, a power price and power budgets of the plurality of cellular users, wherein the power price are determined according to a search interval;

a third determining unit configured to determine, in response to that the search interval is less than a threshold value, the calculated candidates as the D2D transmit powers and the cellular transmit powers; and a second updating unit configured to update, in response to that the search interval is not less than a threshold value, the search interval based on the power price, so as to iteratively calculate the candidates of D2D transmit powers and cellular transmit powers.

13. The apparatus of claim 9, wherein the CSI comprises channel gains from the plurality of cellular users to their respective base stations (BSs), channel gains from the plurality of cellular users to D2D receiver in the D2D pair, channel gains from D2D transmitter in the D2D pair to the D2D receiver, and channel gains from the D2D transmitter to the BSs.

14. The apparatus of claim 13, wherein the channel gains from D2D transmitter to the D2D receiver are obtained by a local BS, and the channel gains from the plurality of cellular users to their respective BSs, the channel gains from the plurality of cellular users to the D2D receiver, and the channel gains from the D2D transmitter to the BSs are collected by BSs managing the plurality of cellular users.

15. The apparatus of claim 13, wherein the cellular transmit powers are determined at the BSs managing the plurality of cellular users, and the D2D transmit powers are determined at the local BS.

16. The apparatus of claim 9, wherein the plurality of cellular weight values and the D2D weight value are set according to service priorities of the plurality of cellular users and the D2D pair.

* * * * *